United States Patent
Tachibana et al.

(10) Patent No.: US 8,175,116 B2
(45) Date of Patent: May 8, 2012

(54) MULTIPROCESSOR SYSTEM FOR AGGREGATION OR CONCATENATION OF PACKETS

(75) Inventors: Kazutaka Tachibana, Hokkaido (JP);
Taku Tanaka, Hokkaido (JP);
Kazuyoshi Horie, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 130 days.

(21) Appl. No.: 11/685,994

(22) Filed: Mar. 14, 2007

(65) Prior Publication Data

US 2007/0223472 A1 Sep. 27, 2007

(30) Foreign Application Priority Data

Mar. 27, 2006 (JP) .................................. 2006-086294

(51) Int. Cl.
*H04J 3/16* (2006.01)
(52) U.S. Cl. ........................................ 370/470; 709/246
(58) Field of Classification Search .................... None
See application file for complete search history.

(56) References Cited

U.S. PATENT DOCUMENTS

| | | | | |
|---|---|---|---|---|
| 5,781,741 A | * | 7/1998 | Imamura et al. ............... | 709/236 |
| 6,678,746 B1 | * | 1/2004 | Russell et al. .................... | 710/1 |
| 7,441,112 B2 | * | 10/2008 | Zimmer et al. ................... | 713/1 |
| 2002/0174316 A1 | * | 11/2002 | Dale et al. ...................... | 711/170 |
| 2003/0152162 A1 | * | 8/2003 | Kojima ......................... | 375/295 |
| 2004/0258081 A1 | * | 12/2004 | Hayashi ......................... | 370/401 |
| 2006/0215691 A1 | * | 9/2006 | Kobayashi et al. ............ | 370/466 |

FOREIGN PATENT DOCUMENTS

| JP | 63275239 A | 11/1988 |
|---|---|---|
| JP | 11317762 A | 11/1999 |

OTHER PUBLICATIONS

Office Action for corresponding JP Application 2006-086294, dated Feb. 22, 2011.
Office Action for corresponding JP Application 2006-086294, dated Dec. 13, 2011.

* cited by examiner

*Primary Examiner* — Huy Vu
*Assistant Examiner* — Benjamin Lamont
(74) *Attorney, Agent, or Firm* — Matthew B. Dernier, Esq.; Gibson & Dernier LLP (57) ABSTRACT

A network processing apparatus is provided. A send buffer receives from a protocol stack a long packet with a data length exceeding a maximum transmission unit defined for a network and stores the long packet. A payload dividing unit divides the payload of the long packet into a plurality of divided payloads. A header duplicating unit duplicates the header of the long packet so as to generate a duplicated header for the respective divided payload. A short packet generating unit attaches the duplicated header to the respective divided payload so as to generate a short packet with a data length equal to or less than the maximum transmission unit to be sent to the network. A sending unit sends the short packet to the network via a physical interface.

3 Claims, 9 Drawing Sheets

MULTIPROCESSOR SYSTEM FOR AGGREGATION OR CONCATENATION OF PACKETS

BACKGROUND OF THE INVENTION

1. Field of the Invention

The present invention relates to a network processing apparatus and a multiprocessor system for sending and/or receiving data through a network.

2. Description of the Related Art

In network communication, specifications and/or regulations for a physical layer and a data link layer may impose a restriction on the data length of a transferable packet. The transferable maximum data length is referred to as maximum transfer unit (MTU). MTU is 1500 bytes for Ethernet or PPP (Point to Point Protocol) and 4352 bytes for FDDI. If the data length of a packet that an application running on a computer is sending exceeds MTU, the packet is divided into packets with a data length equal to or less than MTU in either a socket layer, a transport layer or a network layer and then the divided packets are transferred. The processor of the computer may have to allocate a great amount of resources to networking software such as a protocol stack to perform a protocol processing on the divided packets so that the processing efficiency will deteriorate.

The data transfer speed of Ethernet used to be 10 Mbps, however, 100 Mbps Ethernet is now in wide use and more recently even gigabit Ethernet using an optical fiber is being used. Since the data transfer speed of the network thus increases, a large amount of data will be now sent and received. The small size of the packets in comparison with an amount of data to be transferred will affect transfer processing performance and contribute to communication speed degradation.

Some network interface cards (NIC) allow a supportable packet length to be set to a value more than a normal MTU. A packet having a data length more than MTU is generally called "a jumbo packet". When a jumbo packet function is activated, the data size transferable at one time will become larger and the number of times of transferring packets will decrease. As a result, the processing load in transferring a large amount of data will be reduced and the throughput can be improved.

However, in order to use such a jumbo packet, all devices involving communication, such as communication apparatus at both a sender side and a receiver side, a hub for relaying the packets on the communication route, or the like must support the jumbo packet. If any one of the communication devices does not support the jumbo packets, no jumbo packet is properly transmitted. When a jumbo packet is transmitted via the Internet, most existing routers may not support the jumbo packet and therefore the jumbo packet will be divided into the short packets of a small size equal to or less than MTU and then transmitted. Practically speaking, in the current circumstances, the jumbo packet technique will be therefore effective only in a local area network in which no router is involved in data transfer.

Furthermore, since support for jumbo packets can be device-dependent, a user or a network administrator has to configure settings for enabling a jumbo packet function of all involved communication devices and therefore the administration becomes complicated.

SUMMARY OF THE INVENTION

Accordingly, a general purpose of the present invention is to provide a communication technology which allows an efficient transfer of packets of data size exceeding a maximum data length defined for a network.

According to at least one embodiment of the present invention, a network processing apparatus is provided. The apparatus includes a send buffer, a payload dividing unit, a header duplicating unit, and a packet generating unit. The send buffer receives from a protocol stack a long packet with a data length exceeding a maximum transmission unit defined for a network and stores the long packet. The payload dividing unit divides a payload of the long packet into a plurality of divided payloads. The header duplicating unit duplicates a header of the long packet so as to generate a duplicated header for the respective divided payload. The packet generating unit attaches the duplicated header to the respective divided payload so as to generate a packet with a data length equal to or less than the maximum transmission unit to be sent to the network.

According to another embodiment of the present invention, a network processing apparatus is also provided.

The apparatus includes a receive buffer, a payload concatenating unit, a header aggregating unit, and a packet generating unit. The receive buffer receives from a network a plurality of packets with a data length equal to or less than a maximum transmission unit defined for the network and stores the packets. The payload concatenating unit concatenates payloads of the plurality of packets on a connection-by-connection basis so as to generate a concatenated payload. The header aggregating unit aggregates headers of the plurality of packets on a connection-by-connection basis so as to generate an aggregated header for the concatenated payload. The packet generating unit attaches the aggregated header to the concatenated payload so as to generate a long packet exceeding the maximum transmission unit to be provided to a protocol stack.

Herein, it is implied by aggregating a plurality of headers to generate a single header that a plurality of headers are aggregated in such a manner that if a common part exists among the header contents of the headers, the common part is consolidated to one without being duplicated. Such header aggregation will be regarded as an example of generally called data aggregation. However, when the term "header aggregation" is used, it does not intend to exclude the concept that even if the headers have some common contents, a plurality of headers are consolidated into a single header with the common contents being duplicated. The term "header aggregation" implies either case where the headers are consolidated in such a manner that such the duplication is completely eliminated, the duplication is allowed to a certain extent, or the duplication is not eliminated at all.

According to yet another embodiment of the present invention, a network processing apparatus is also provided. The apparatus includes a receive buffer, a payload concatenating unit, a header aggregating unit, and an input/output interface. The receive buffer receives from a network a plurality of packets with a data length equal to or less than a maximum transmission unit defined for the network, the receive buffer comprising a header buffer and a payload buffer which respectively stores headers and payloads separated from the respective packets. The payload concatenating unit concatenates the payloads of the plurality of packets on a connection-by-connection basis so as to generate a concatenated payload in the payload buffer. The header aggregating unit aggregates headers of the plurality of packets on a connection-by-connection basis so as to generate an aggregated header for the concatenated payload in the header buffer. The input/output interface transfers to an upper layer the aggregated header from the header buffer and the concatenated payload from the payload buffer, independently of each other.

According to yet another embodiment of the present invention, a multiprocessor system is provided. The multiprocessor system includes a plurality of processors and a main memory. Each of the plurality of processors includes a local memory. One processor among the plurality of processors is operable as a protocol stack for performing protocol processing on data to be exchanged via a network on behalf of the rest of the processors. The main memory is shared by the plurality of processors. A header and a payload are separated from a packet to be sent or received via a network and the payload is transferred to an area in the main memory to be referred to by the rest of the processors, while the header is transferred to the local memory of the one processor. The one processor is configured to perform a protocol processing on the packet according to the header transferred to the local memory thereof.

According to yet another embodiment of the present invention, a multiprocessor system is also provided. The multiprocessor system includes a plurality of processors and a main memory. Each of the plurality of processors includes a local memory. One processor among the plurality of processors is operable as a protocol stack for performing protocol processing on data to be exchanged via a network on behalf of the rest of the processors. The main memory is shared by the plurality of processors. When a plurality of packets with a data length equal to or less than a maximum transmission unit defined for the network are received from the network, data in which payloads of the plurality of packets are concatenated on a connection-by-connection basis is transferred to an area in the main memory to be referred to by the rest of the processors, while each individual header of the plurality of packets concatenated on a connection-by-connection basis are transferred to the local memory of the one processor. The one processor is configured to perform a protocol processing on the plurality of packets according to the individual headers transferred to the local memory thereof. The rest of the processors retrieve the concatenated data from the main memory in response to a result of the protocol processing by the one processor.

Optional combinations of the aforementioned constituting elements, and implementations of the invention in the form of methods, apparatuses, systems computer programs, data structures, recording mediums, etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

First Embodiment

An information processing system according to the first embodiment of the present invention, when an application in an upper layer sends and receives data via a network, handles a long packet of data size exceeding a maximum transfer unit defined for the network, in a protocol stack and a network driver implemented in an operating system. Then, the system divides the long packet into packets of data size equal to or less than the maximum transfer unit in a network device such as a network interface card or the like and transfers the divided packets.

Figure 1:
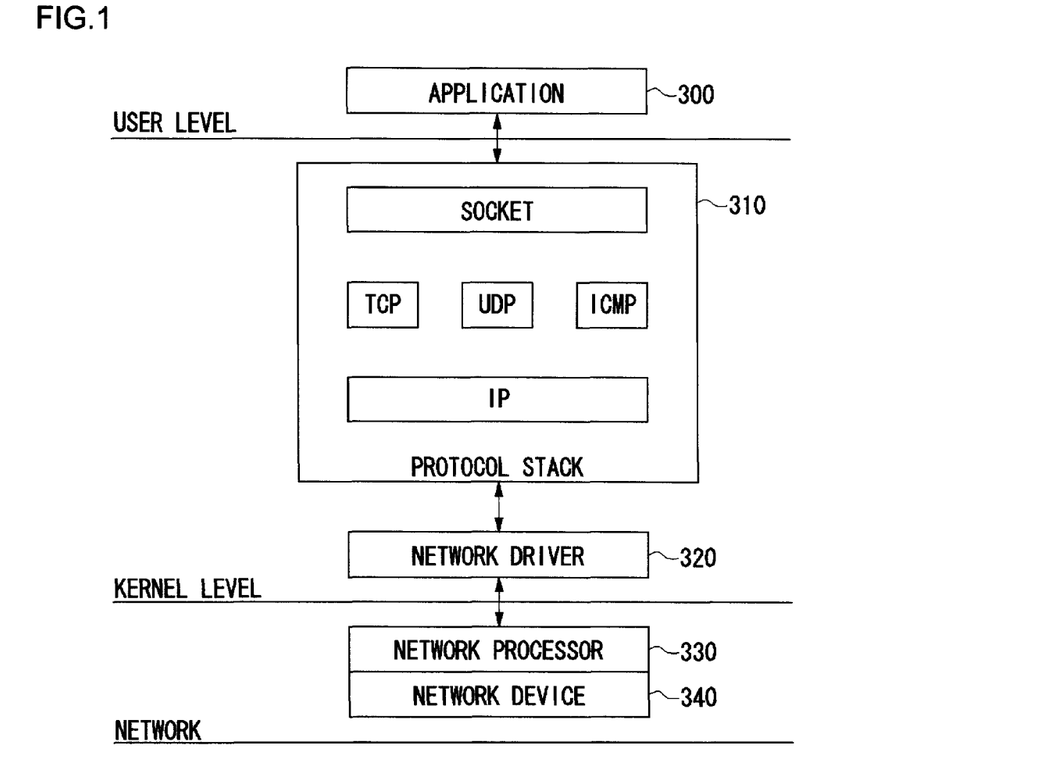
FIG. 1 illustrates a hierarchical functional structure of an information processing apparatus according to the first embodiment of the present invention.

FIG. 1 illustrates a hierarchical functional structure of the information processing apparatus according to the embodiment. An application 300 is in a user level which is an upper layer of the information processing system and this level corresponds to an application layer of OSI (Open Systems Interconnection) reference model. A protocol stack 310 and a network driver 320 are in a kernel level which is a lower layer.

The protocol stack 310 is networking software which is composed of protocols piled up in layers for performing networking functions. The stack 310 includes socket corresponding to a session layer, TCP (Transmission Control Protocol) or UDP (User Datagram Protocol) corresponding to a transport layer and IP (Internet Protocol) corresponding to a network layer. In the figure, ICMP (Internet Control Message Protocol) is depicted in the same layer as TCP and UDP, however, ICMP is a protocol for transferring error messages or control messages of the IP layer and its not directly involved in data transfer. Therefore ICMP is often regarded as one belonging to the network layer as IP does.

The protocol stack 310 performs protocol processing on data given from the application 300 and provides the processed data as a send packet to a network driver 320. The protocol stack 310 also performs protocol processing on a received packet given from the network driver 320 and provides the received data to the application 300.

The network driver 320 is fundamental software to operate the network in a physical layer and the driver 320 is located in a data link layer. The physical layer includes a network processor 330 and a network device 340. As an example, the network device 340 is a network interface card (NIC) and the network processor 330 is a processor on the NIC.

Figure 2:
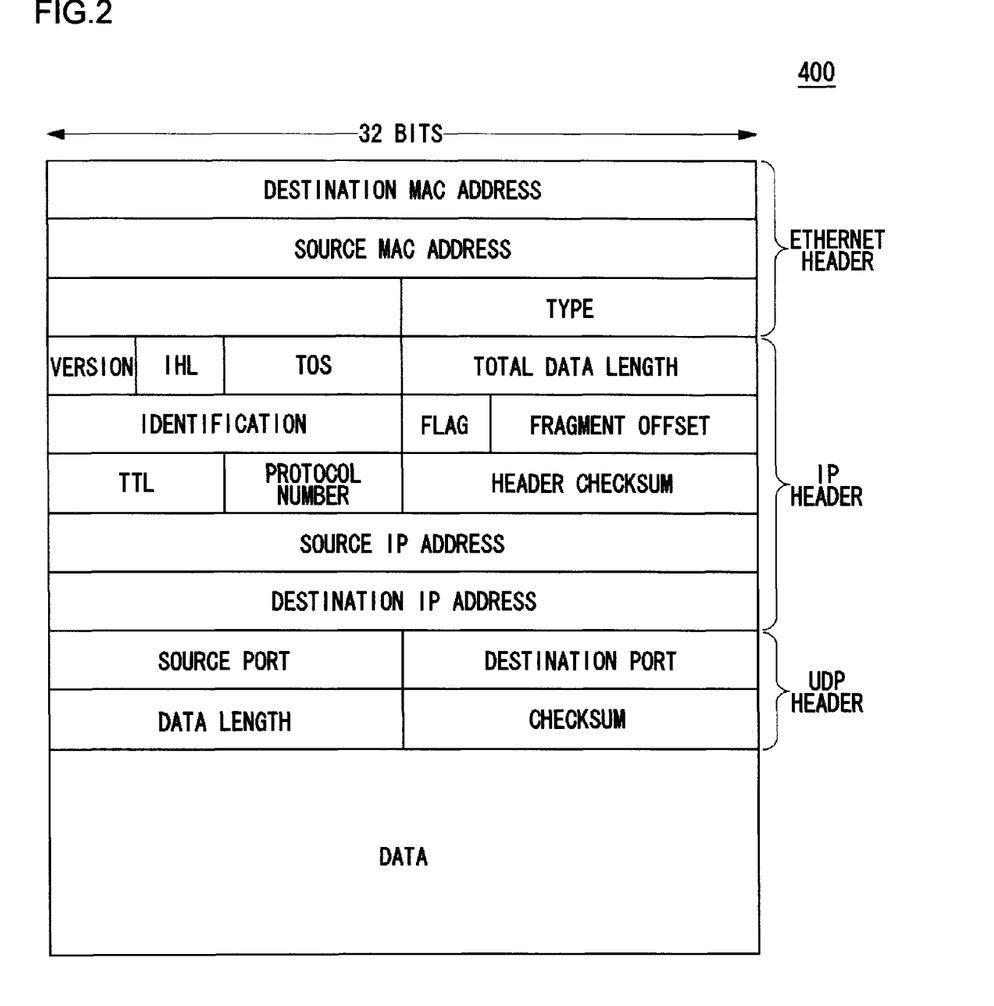
FIG. 2 shows an example of a packet format to be sent and received through a network.

FIG. 2 shows an example of a packet format 400 to be sent and received through the network. The packet format 400 is shown for the case that Ethernet is used in the physical layer and the data link layer, IP in the network layer and UDP in the transport layer. The packet format 400 includes an Ethernet header, an IP header, a UDP header and data. It is noted that a packet may be generally called a frame for Ethernet, however the term "packet" is used hereinafter.

The Ethernet header includes a destination MAC (Media Access Control) address, a source MAC address, and a type.

The IP header includes a version number, IHL (Internet Head Length) indicating a header length, TOS (Type Of Service) indicating the order of priority, total length indicating the sum of a header and a payload, identification to be incremented every time an IP datagram is sent, flag, fragment offset, TTL (Time To Live), protocol number, header checksum, source IP address, and destination IP address.

The UDP header includes source port, destination port, data length, and checksum.

The data is a remaining part excluding the above-mentioned types of headers from a packet, and it is called a payload. When TCP is adopted in the transport layer for communication, a TCP header is provided instead of the UDP header.

Figure 3:
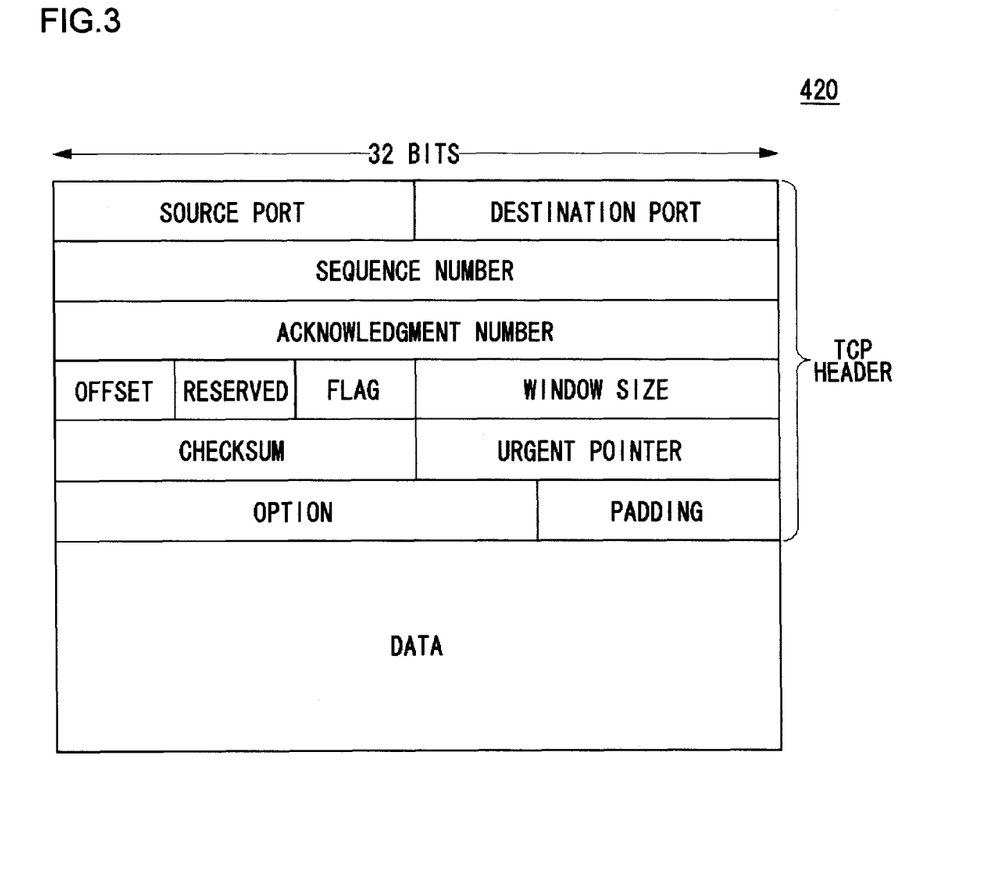
FIG. 3 shows a TCP header format.

FIG. 3 shows a TCP header format 420. The TCP header format 420 includes a TCP header and data. The TCP header includes source port, destination port, sequence number, acknowledgment number, offset, reserved, flag, window size, checksum, urgent pointer, option, and pudding.

When data of large size is transferred through the network, the data is divided into a plurality of packets in accordance to MTU defined for the network and then the packets are transferred. However, the field values of the header of these packets will be identical with a few exceptions. In the packet format 400 of FIG. 2, the destination MAC address, the source MAC address, the type filed of Ethernet header 402 have the same values, and the values of all fields of the IP header 404 except the total data length, the identification, the header checksum are the same. In the UDP header 406, the source port and the destination port are the same. If the data size of each packet is identical, the total data length field of the IP header 404 and the data length field of UDP header 406 will have the same values. In the TCP header format 420 of FIG. 3, the source port and the destination port of the TCP header 422 are the same.

Data of large size is divided into a plurality of packets of small size in either socket, TCP/UDP, or IP layer of the protocol stack 310 of FIG. 1. In layers lower than the layer where the divided packets have been generated, the protocol processing is performed according to the headers of the plural divided packets. As described above, a substantial number of fields of the headers of the divided packets have the identical values. When a plurality of the divided packets are subject to the protocol processing, these similar headers are repeatedly referenced and the contents of the headers are analyzed. Therefore, system resources such as CPU, memory or the like are consumed to a large extent and the overhead of the protocol processing increases, resulting in the degradation in communication performance.

The information processing system of this embodiment handles a long packet of data size exceeding MTU in the protocol stack and divides the long packet into short packets of data size equal to or less than MTU at the time of sending to the network. The system generates the headers of the divided short packets by duplicating the header of the long packet. The system also generates a long packet of size exceeding MTU by concatenating the short packets received from the network on a connection-by-connection basis and aggregating the headers into one, and then provides the generated long packet to the protocol stack. Thereby, the protocol processing on the headers of packets of small size is not required to be repeated in the protocol stack so that the processing load will be reduced and the communication performance can be improved.

Figure 4:
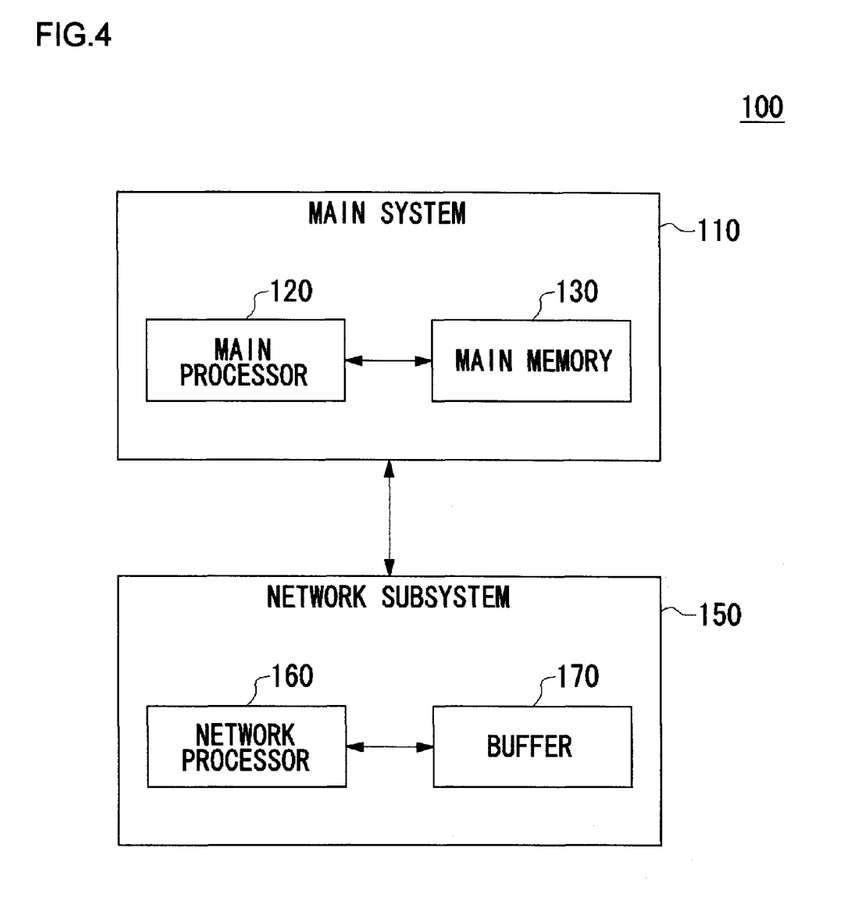
FIG. 4 shows a structure of an information processing system according to the first embodiment.

FIG. 4 shows the structure of the information processing system 100 according to the first embodiment. The information processing system 100 includes a main system 110 and a network subsystem 150 that are connected with each other via a bus.

The main system 110 includes a main processor 120 and a main memory 130. Using the main memory 130, the main processor 120 executes the functions of the application 300, the protocol stack 310 and the network driver 320 of FIG. 1. Then the main processor 120 provides the network subsystem 150 with the packets to be sent to the network and also obtains from the network subsystem 150 the packets received from the network.

Even if the size of data that the application requires to send or receive exceeds MTU, the protocol stack implemented in the main system 110 handles the data as a single packet and performs protocol processing on the packet.

Since the protocol processing is performed by analyzing the contents of the header, the protocol processing itself is not required to be altered even if the data length exceeds MTU and therefore any existing protocol stack can be used.

The network subsystem 150 corresponds to the network processor 330 and the network device 340 of FIG. 1. The network subsystem 150 includes a network processor 160 and a buffer 170. The network processor 160 stores the packets sent to the network and received from the network into the buffer 170 and performs the packet transfer processing.

The network subsystem 150 performs the processing for dividing a long packet of data size exceeding MTU provided from the main system 110 into short packets of data size equal to or less than MTU and then sending the short packets to the network. The network subsystem 150 also performs the processing for concatenating the short packets received from the network on a connection-by-connection basis so as to generate a long packet of data size exceeding MTU and then providing the long packet to the main system 110.

DMA (Direct Memory Access) transfer is one of methods for transferring a send packet from the main memory 130 of the main system 110 to the buffer 170 of the network subsystem 150 and transferring a receive packet from the buffer 170 of the network subsystem 150 to the main memory 130 of the main system 110. The DMA transfer is a method for transferring data directly between the network subsystem 150 and the main memory 130 of the main system 110 without involving the main processor 120 of the main system 110, which enables a fast data transfer.

Figure 5:
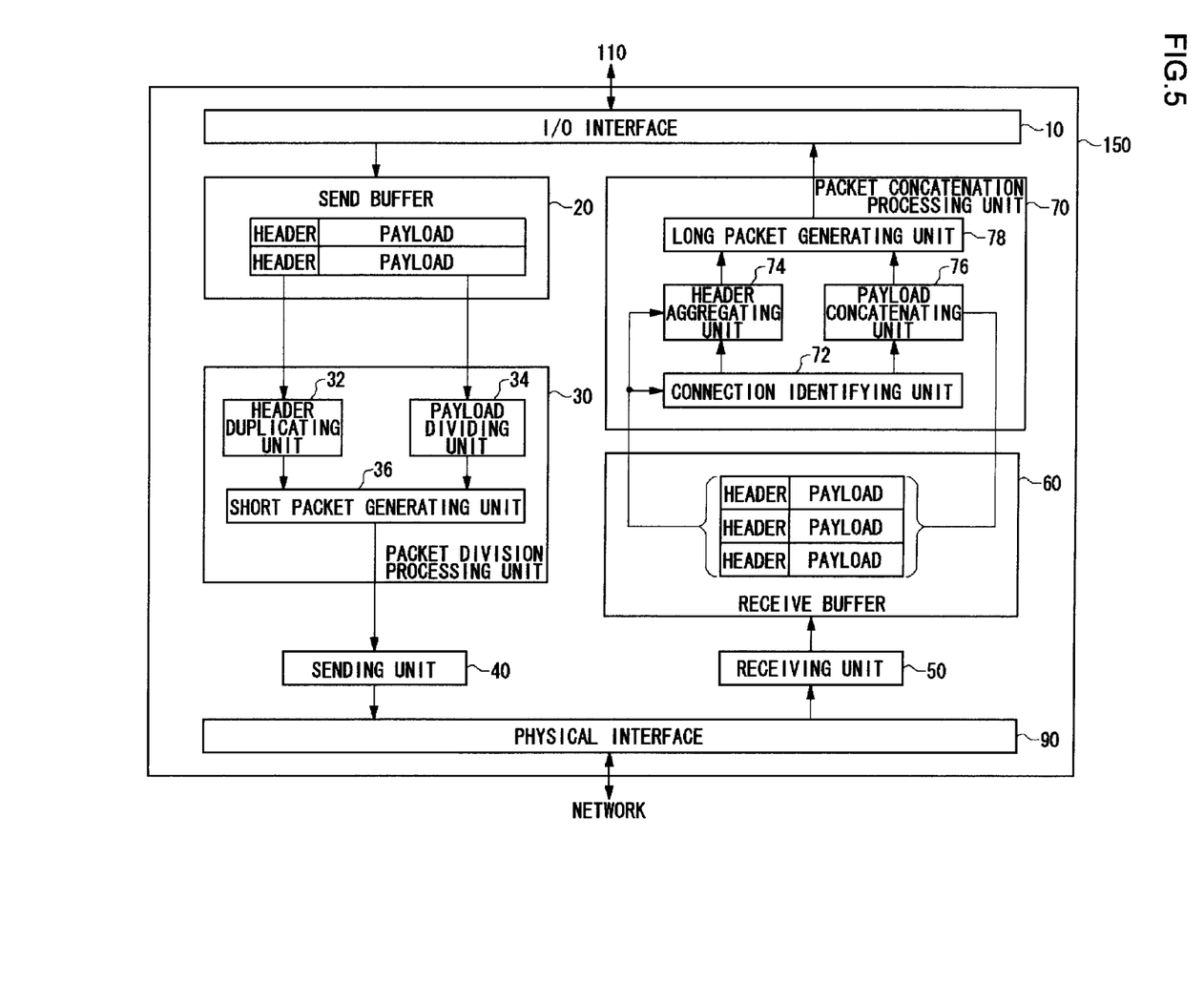
FIG. 5 shows a functional structure of the network subsystem of FIG. 4.

FIG. 5 shows a functional structure of the network subsystem 150. The figure shows a block diagram focused on functions. These function blocks may be realized in various forms such as hardware only, software only, or a combination thereof.

The input/output interface 10 is an interface for exchanging data with the main system 110 that has, as an example, a DMA controller function.

The send buffer 20 stores long packets of data length exceeding MTU provided from the main system 110.

The packet division processing unit 30 retrieves a long packet from the send buffer 20 and performs processing for dividing the long packet into a plurality of packets of a predefined size so that the data length including the header can be equal to or less than MTU. The packet division processing unit 30 includes a header duplicating unit 32, a payload dividing unit 34 and a short packet generating unit 36.

The payload dividing unit 34 obtains the payload of the long packet from the send buffer 20 and divides it into a plurality of payloads of a predefined data size equal to or less than MTU. The header duplicating unit 32 duplicates the header of the long packet so as to generate a header for the payloads divided by the payload dividing unit 34.

After duplicating the header of the long packet, the header duplicating unit 32 changes the values of the fields to which different values should be assigned for every divided packet. For instance, the total data length, the identification and the header checksum of IP header, the data length and the checksum of UDP header if it is a UDP packet, and the sequence number and the checksum of TCP header if it is a TCP packet are recalculated for each divided packet and then the new values are set to the respective fields.

The short packet generating unit 36 attaches the header generated by the header duplicating unit 32 to the payload divided by the payload dividing unit 34 so as to generate a short packet. The short packet generated by the short packet generating unit 36 is provided to the sending unit 40 and the sending unit 40 sends the short packet to the network via the physical interface 90. Preferably, a plurality of short packets generated from the long packet are sequentially transmitted to the physical layer one after another in the order of generation, without being buffered until the division of the whole long packet is fully completed. This has an advantage that a required capacity of the buffer can be reduced.

The receiving unit 50 receives packets from the network via the physical interface 90 and stores them in the receive buffer 60. When data of large size is received, a number of received packets of the same connection will be stored in the receive buffer 60. Alternatively, a large number of packets of a small data size may be consecutively received in the same connection.

The packet concatenation processing unit 70 retrieves a plurality of the received packets of data length equal to or less than MTU from the receive buffer 60. Then the packet concatenation processing unit 70 performs processing for concatenating these packets while excluding their headers and then attaching a single header to the concatenated packet so as to generate a long packet of data length exceeding MTU. The packet concatenation processing unit 70 includes a connection identifying unit 72, a header aggregating unit 74 and a payload concatenating unit 76.

Since the packets may arrive asynchronously, a predefined waiting time is provided in order to wait until a certain amount of packets are stored in the receive buffer 60.

The connection identifying unit 72 identifies the connection that each packet belongs to by examining the headers of the packets that have been stored during the waiting time. Then the connection identifying unit 72 notifies to the header aggregating unit 74 and the payload concatenating unit 76 the packets belonging to the same connection. It can be distinguished by the combination of the IP address and the port number included in the headers whether the packets belong to the same connection or not.

The payload concatenating unit 76 concatenates the payloads of the packets of the same connection. The header aggregating unit 74 aggregates the headers of the packets of the same connection so as to generate a single header. The header aggregated by the header aggregating unit 74 is a header to be attached to the payload concatenated by the payload concatenating unit 76. The common fields such as the source and destination addresses, the source and destination ports and the like are aggregated, while the fields different for every packet such as the sequence number, the checksum and the like are adjusted so as to be suitable for the concatenated packet.

The long packet generating unit 78 attaches the header aggregated by the header aggregating unit 74 to the payload concatenated by the payload concatenating unit 76 so as to generate a long packet and then provides the long packet to the main system 110 via the input/output interface 10.

The waiting time for the arrival of the packets to be concatenated may be fixed to a certain value, however it is more preferable that the waiting time is set to a small value in the beginning and then changed gradually to a larger value as the number of packets arriving from the same connection increases. This is a so-called "slow start" algorithm. If the waiting time is set to a large value from the beginning in spite of the situation in which the packets are not consecutively arriving, delay may occur in processing the packets. By slowly starting the waiting time and adjusting it by learning, the occurrence of the delay can be avoided. Furthermore, when a large number of packets arrive, the number of packets to be concatenated will increase and then a long packet of as large size as possible will be generated, resulting in reduction of a load on the protocol stack.

The respective functions of the packet division processing unit 30, the sending unit 40, the receiving unit 50, and the packet concatenation processing unit 70 are performed by the network processor 160 of FIG. 4. These functions can be implemented as an embedded operating system, for instance. The send buffer 20 and the receive buffer 60 is provided in the buffer 170 of FIG. 4.

Figure 6:
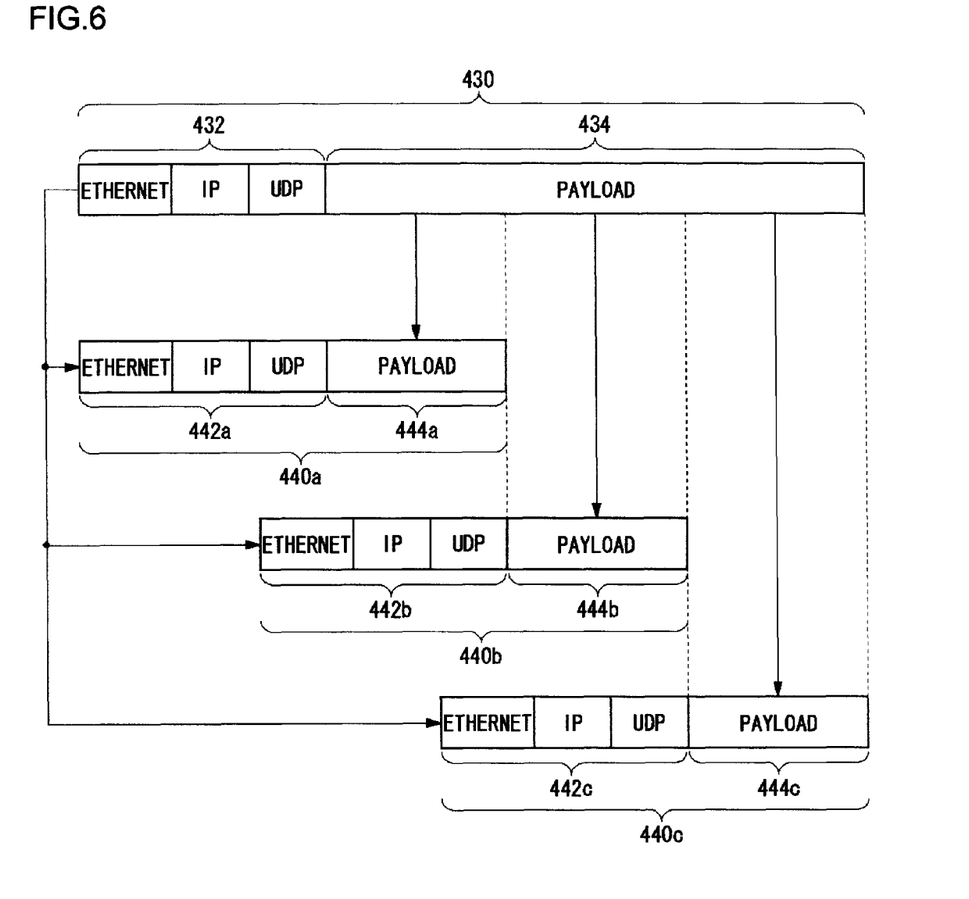
FIG. 6 shows how the packet division processing unit of FIG. 5 divides a long packet into a plurality of short packets.

FIG. 6 shows how the packet division processing unit 30 divides a long packet into a plurality of short packets. The long packet 430 includes an Ethernet header, an IP header and a UDP header (these headers as a whole are referred to as an original header 432) and a payload 434. The figure illustrates that the payload 434 of the long packet 430 are divided into three payloads 444*a*-444*c*, and the headers 442*a*-442*c* each of which is a duplication of the original header 432 of the long packet 430 are attached to the respective payloads 444*a*-444*c*. The short packets 440*a*-440*c* of the data length reduced to equal to or less than MTU are thus generated.

The respective headers 442*a*-442*c* of the short packets 440*a*-440*c* are basically a duplication of the original header 432 of the long packet 430, however, the values of the fields different for the respective short packets 440*a*-440*c* are appropriately revised.

Figure 7:
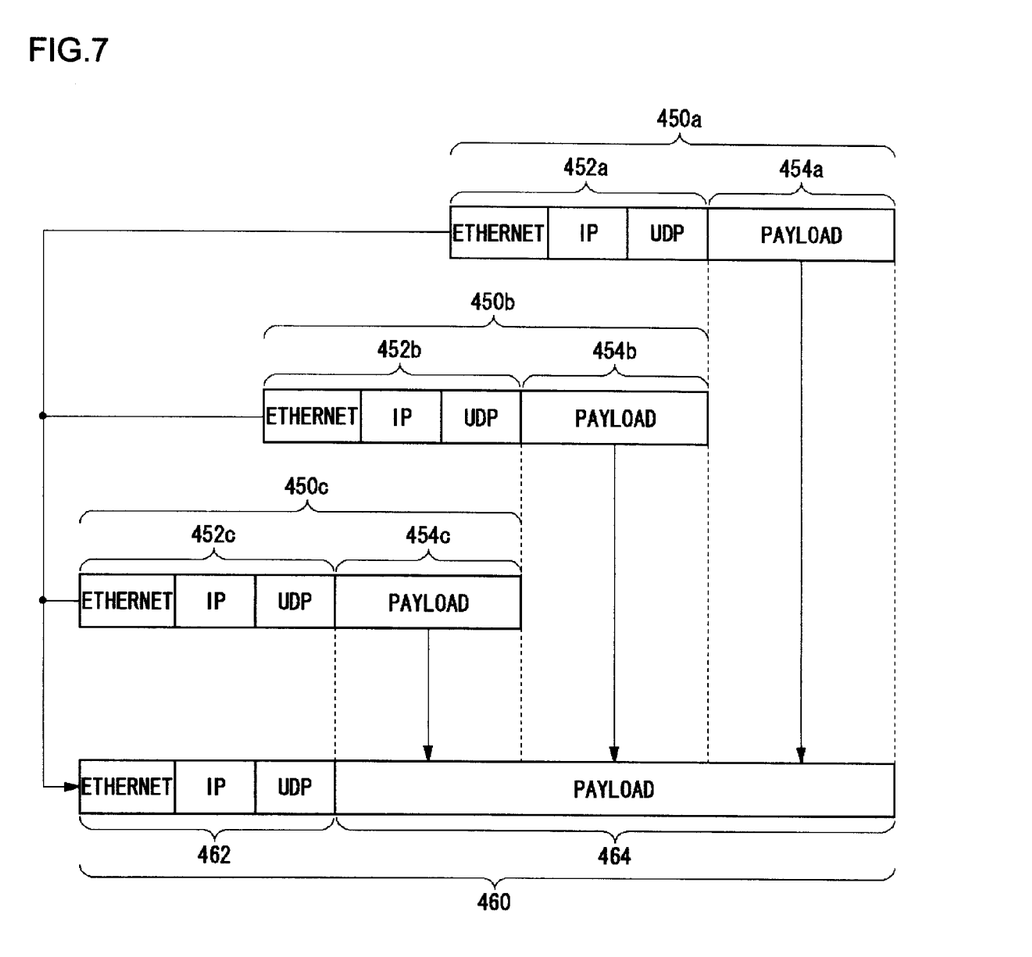
FIG. 7 shows how the packet concatenation processing of FIG. 5 concatenates short packets so as to generate a long packet.

FIG. 7 shows how the packet concatenation processing unit 70 concatenates the short packets so as to generate a long packet.

The figure illustrates that three short packets 450*a*-450*c* of size equal to or less than MTU are concatenated so that a single long packet 460 is generated. The payloads 454*a*-454*c* of the respective short packets 450*a*-450*c* are concatenated in the order of the identification number of the IP header so that a single payload 464 is formed. The respective headers 452*a*-452*c* of the short packets 450*a*-450*c* are aggregated into a single header 462 by consolidating the values of the common fields and then the aggregated header 462 is attached to the concatenated payload 464 as its header.

Since the fields of the respective headers 442*a*-442*c* of the short packets 440*a*-440*c* basically have the common values, they can be aggregated into the header 462 of the concatenated payload 464. However, the fields different for the respective short packets 440*a*-440*c* will be revised to the values corresponding to the concatenated payload 464. It is noted that the checksum is not required to be reset for the long packet 460, because the checksums of the headers of the respective short packets 440*a*-440*c* have been already checked at the time of reception.

As described above, by the information processing system 100 according to the first embodiment, the network processor divides a long packet provided from the protocol stack of the host system into short packets with the data length equal to or less than MTU and sends the short packets. The network processor also concatenates the received short packets into a long packet and provides the long packet to the protocol stack. Thus, the protocol stack of the host system can virtually handle the long packet with the data length exceeding MTU. Thereby, when data of a large size is sent or received, the data can be subject to the protocol processing as a single packet, resulting in reduction of the processing load imposed on the networking software such as a protocol stack as typified by TCP/IP. Furthermore, when the network processor divides the long packet given from the protocol stack of the host system into the short packets and sends them, it is only necessary that the network processor duplicates the header of the long packet and then appropriately changes the values of the fields for which the different values are set for each short packet. Therefore, the process for generating the headers does not impose a heavy processing load on the network processor. Thus, there is an advantage that the system can decrease not only the processing load on the host system but also the processing load on the network processor, when a long packet is transmitted.

Furthermore, when some packets of a small size are continuously received for a certain period, the network processor concatenates these received packets into a long packet. Therefore, the processing load can be reduced to a larger extent compared to a situation in which a large number of the received packets are subject to the protocol processing.

Second Embodiment

In the first embodiment, when a plurality of short packets are concatenated and a long packet is generated, the headers of the respective short packets are aggregated into a single header and then the headers of the short packets are discarded because they are not needed. However, some protocol may insert various types of control information in a header attached to each packet in order to secure the integrity and confidence of data or guarantee the reliability of data transfer. If the headers are discarded after the packet concatenation, such control information will be lost. Therefore, the network subsystem 150 of the information processing system 100 according to the second embodiment does not discard the headers of the respective short packets but transfers them to the main system 110.

Figure 8:
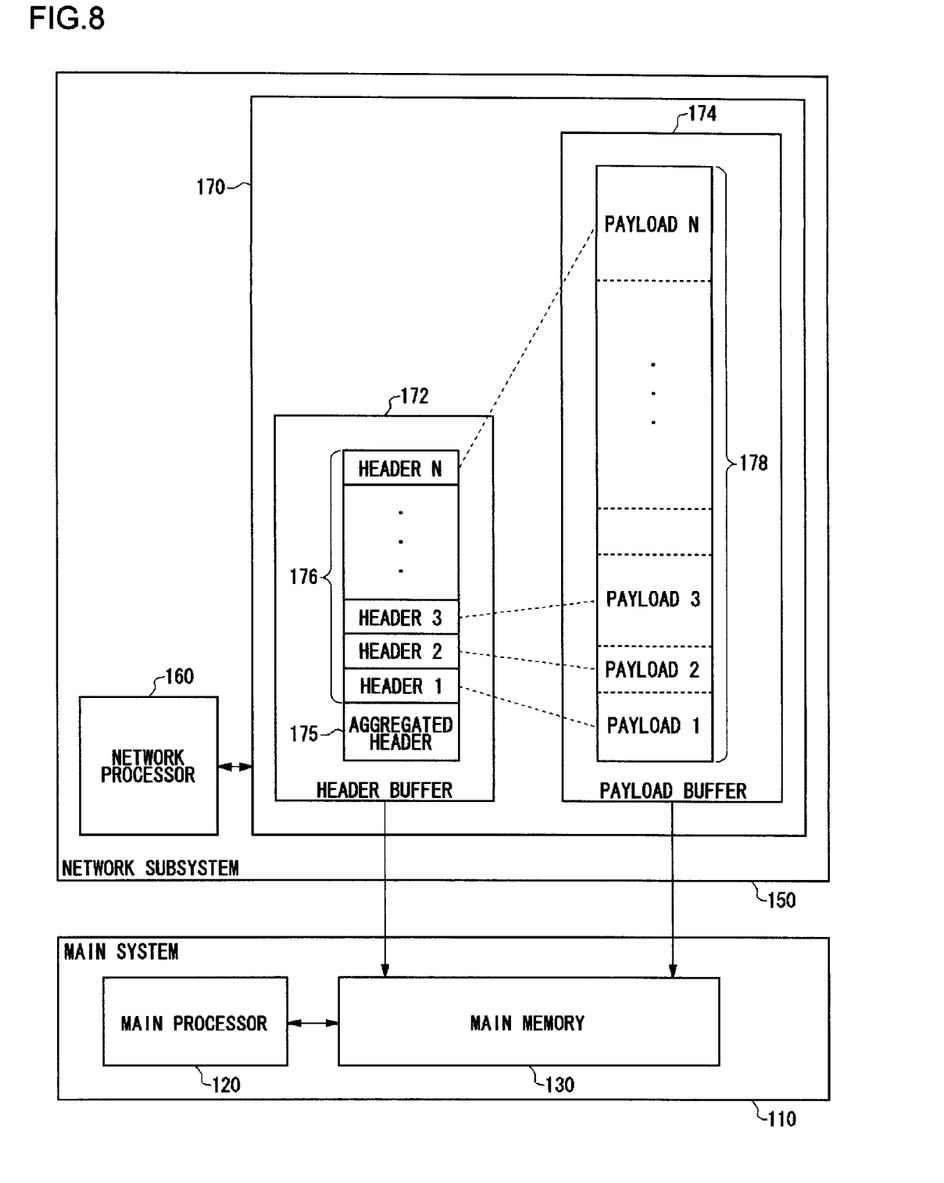
FIG. 8 shows a structure of an information processing system according to the second embodiment of the present invention.

FIG. 8 shows a structure of the information processing system 100 according to the second embodiment. In the buffer 170 of the network subsystem 150, a header buffer 172 and a payload 174 are provided, which respectively retain the header and the payload of a received short packet separately. In this embodiment, the header and the payload are stored in the separate buffers and controlled independently of each other. DMA is used for the data transfer so that the header and the payload can be separately and independently transferred to the main memory 130 of the main system 110.

The network subsystem 150 includes the functional structure of FIG. 5 described in the first embodiment, however, the long packet generating unit 78 for attaching a header to the concatenated payload is not provided because the header and the payload are separately transferred to the main system 110. Instead, the network subsystem 150 is so configured that the header aggregating unit 74 and the payload concatenating unit 76 respectively transfer by DMA the headers and the payloads separately and independently to the main system 110 via the input/output interface 10.

In addition, the header aggregating unit 74 of the second embodiment transfers to the main system 110 not only a single header in which the individual headers of a plurality of short packets of the same connection have been aggregated but also the individual headers of the short packets.

The individual headers 1 to N (numeral 176) of N short packets received from the network are stored in the header buffer 172. The header aggregating unit 74 aggregates these headers 1 to N into a single header 175 and stores it in the header buffer 172. The individual headers 176 stored in the header buffer 172 together with the aggregated header 175 are transferred by DMA to the main memory 130 of the main system 110.

The respective payloads 1 to N (numeral 178) of the N short packets are stored in the payload buffer 174 and these payloads 1 to N are concatenated by the payload concatenating unit 76. The concatenated payload is transferred by DMA to the main memory 130 of the main system 110. Since the data length of the concatenated payload may possibly grow, it will take a longer time to transfer the concatenated payload to the main memory 130 than to transfer the individual headers 1 to N and the aggregated header. Since the individual headers 1 to N and the aggregated header are transferred in advance to the main memory 130, the main processor 120 can analyze the individual headers 1 to N beforehand and perform protocol processing. In the meantime, the concatenated payload is being transferred to the main memory 130 in the background. After completing the analysis of the headers, the main processor 120 proceeds to process the concatenated payload that has been transferred to the main memory 130 in the background.

Since the header and the payload are separated, the header can be passed to the protocol stack, while the payload that is not involved in the protocol processing can be directly passed to a memory area to be referenced by the application. For passing the payload to the memory area of the application, a so-called zero-copy technique can be used to omit the process for copying data from the protocol stack to the application and reduce the overhead caused by copying.

It is only necessary that the data used by the application is provided to the application at the time when the protocol processing is completed. Therefore, the DMA controller for the payload can transfer in the background the concatenated payload to the memory area of the application while the protocol stack is performing the protocol processing on the headers.

By the information processing system 100 according to the second embodiment, in such a situation where IP packets including their header information are encrypted for IPsec (Security Architecture for Internet Protocol), or where the header information such as a sequence number is necessary for retransmission when TCP is used as a transport layer protocol, the individual headers of the respective un-concatenated short packets are provided to the protocol stack. Therefore, the protocol stack can decode the IP packets or perform retransmit control for TCP. Furthermore, since the transfer routes are separated between the header and the payload, the individual headers of the short packet can be subject to the protocol processing while the concatenated payload is being transferred to the memory in the background, resulting in improvement of the processing efficiency.

According to the above explanation, the individual headers of the plural packets of the same connection are transferred together with the aggregated header to the memory, however, the system can be configured in such a manner that the headers are not aggregated and only the individual headers of the plural packets are transferred to the memory.

Third Embodiment

Figure 9:
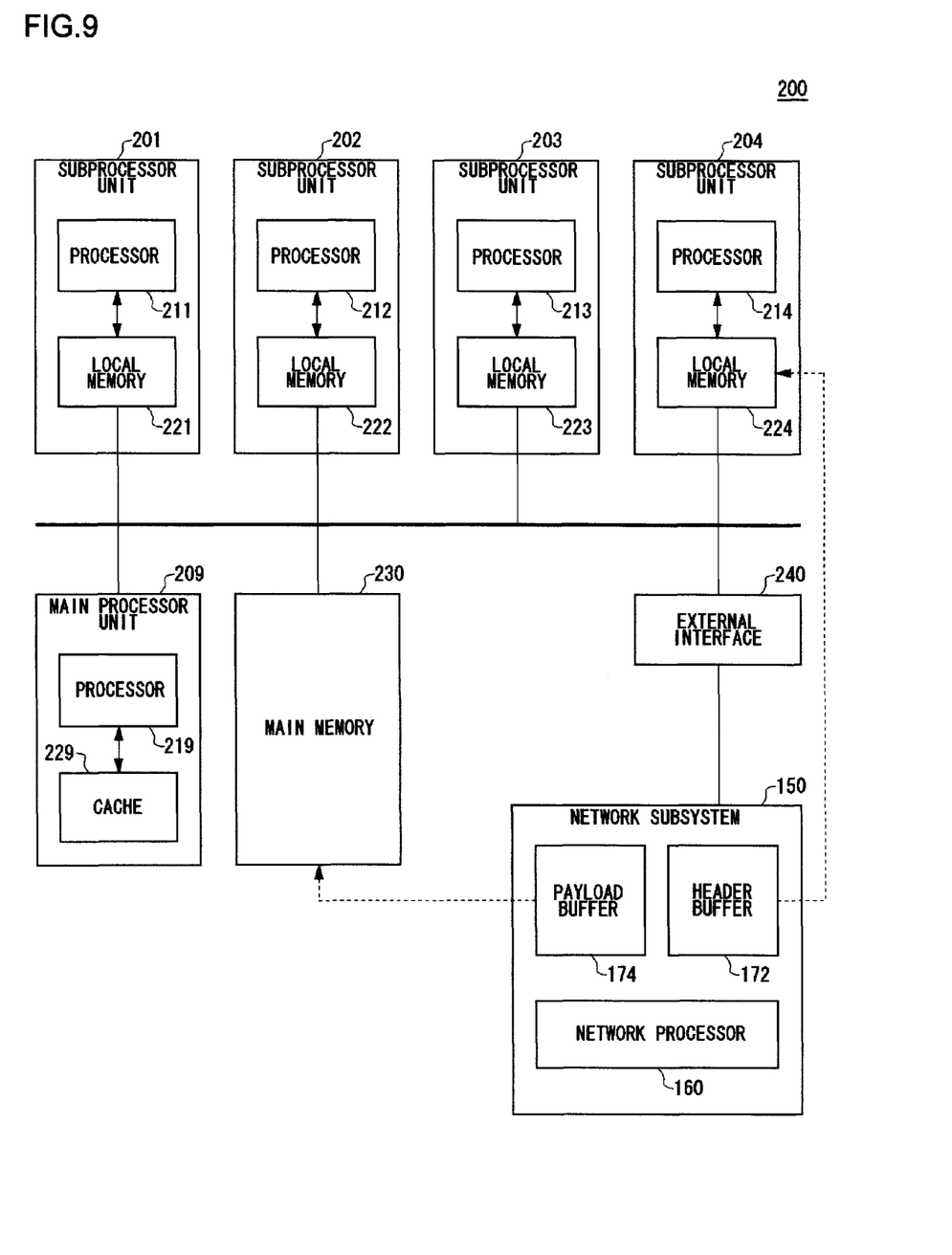
FIG. 9 shows a structure of a multiprocessor system according to the third embodiment of the present invention.

In the third embodiment, the system is so configured that the main system 110 of the second embodiment is implemented by a multiprocessor system having a plurality of processors.

FIG. 9 shows a structure of the multiprocessor system 200 according to the third embodiment.

The multiprocessor system 200 includes a plurality of subprocessor units (four in the figure) 201-204, a main processor unit 209 which controls these subprocessor units 201-204, and a main memory 230 shared by the main processor unit 209 and the subprocessor units 201-204. The multiprocessor system 200 is connected to a network subsystem 150 via an external interface 240.

The network subsystem 150 is the same one described in the second embodiment which includes the network processor 160 and the buffer 170. The buffer 170 has a header buffer 172 and a payload buffer 174.

Each subprocessor unit 201-204 includes a processor 211-214 and a local memory 221-224. The local memory 221-224 is a dedicated memory that the processor 211-214 can access at a high speed. The main processor unit 209 includes a processor 219 and a cache 229.

The main processor unit 209, the subprocessor units 201-204, the main memory 230 and the external interface 240 may be integrated into one package forming a multi-core processor.

One subprocessor unit among a plurality of the subprocessor units, the fourth subprocessor unit 204 in the example shown in the figure, has a networking function such as a protocol stack, while the rest of the subprocessor units, the first to the third subprocessor units 201-203 in the figure, execute an application that uses the network. Since the subprocessor unit 204 dedicated for a network processing is provided, the network processing can be offloaded from the other subprocessor units 201-203 that executes the application. The system may be configured in such a manner that the main processor unit 209 has a networking function.

The network subsystem 150 transfers by DMA to the local memory 224 of the fourth subprocessor unit 204 the individual headers of a plurality of short packets to be concatenated and/or the aggregated header stored in the header buffer 172, while transferring by DMA to the main memory 230 the concatenated payload stored in the payload buffer 174.

The processor 214 of the fourth subprocessor unit 204 performs protocol processing by referring to the individual headers of the short packets and/or the aggregated header transferred to the dedicated local memory 224. After the fourth subprocessor unit 204 completes the protocol processing, the first to the third subprocessor units 201-203 refer to the concatenated payload transferred to the main memory 230 as data sent to themselves.

In the above description, when a plurality of packets received by the network subsystem 150 are concatenated, the concatenated payload and the individual headers of the respective packets and/or the aggregated header are handled separately. Then the concatenated payload is transferred to the main memory 230, while the individual headers of the respective packets and/or the aggregated header are transferred to the local memory 224 of the subprocessor unit 204 dedicated for the network processing.

As one of variations, even if the short packets are not concatenated and are sent or received as they are, the header and the payload may be handled separately. Then the header may be buffered in the local memory 224 of the subprocessor unit 204 dedicated for the network processing, while the payload may be buffered in the main memory 230.

By the multiprocessor system 200 according to the third embodiment, the header and the payload of the packets received from the network are separated. Then the header is stored in the dedicated local memory of the subprocessor unit dedicated for the network processing, while the payload is stored in the main memory shared by a plurality of the subprocessor units. Thereby, the subprocessor unit dedicated for the network processing can perform protocol processing at high speed by referring to the header stored in the local memory. In addition, since the header and the payload are separated and subject to the transfer control, the application running on the subprocessor unit can read/write the data from/to the main memory in parallel to the protocol processing so that the overall processing efficiency of the system can improve. Especially when a plurality of received packets are concatenated, the data length of the concatenated payload will become long. Therefore, if the header and the payload are separated and subject to the transfer control, the improvement in the processing efficiency will be more significant.

The description of the invention given above is based upon some embodiments. The embodiments described are only illustrative in nature and various variations in constituting elements and processes involved are possible. Those skilled in the art would readily appreciate that such variations are also within the scope of the present invention. Some such variations will now be described.

The packet concatenation processing unit 70, the packet division processing unit 30 and other functions of the network subsystem 150 may be provided as a part of functions of the main system 110, for instance, they may be provided in the network driver 320.

The network interface card has been exemplified as an implementation example of the network subsystem 150, however, the network subsystem 150 may be implemented as a network device such as a switching hub or the like.

In the above description, Ethernet is assumed as a data link layer and a physical layer, however, the network is not limited to Ethernet and may be wireless LAN, FDDI or the like. The described embodiments are effective in any type of networks.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A network processing apparatus comprising:
a receive buffer, which receives from a network a plurality of packets with a data length equal to or less than a maximum transmission unit defined for the network, the receive buffer comprising a header buffer and a payload buffer that respectively stores headers and payloads separated from the respective packets;
a payload concatenating unit, which concatenates the payloads of the plurality of packets on a connection-by-connection basis so as to generate a concatenated payload in the payload buffer;
a header aggregating unit, which aggregates headers of the plurality of packets on a connection-by-connection basis so as to generate an aggregated header for the concatenated payload in the header buffer; and
an input/output interface, which transfers to an upper layer the aggregated header from the header buffer and the concatenated payload from the payload buffer, independently of each other, and which transfers each individual header of the plurality of packets to be processed on a connection-by-connection basis, together with the aggregated header or in substitution for the aggregated header, wherein:

the network processing apparatus is connected with a multiprocessor system comprising a main processor, a plurality of subprocessors each including a local memory and controlled by the main processor, and a main memory that is external to and shared by the main processor and the plurality of subprocessors, a designated subprocessor among the plurality of subprocessors designated by the main processor as a dedicated subprocessor to implement a protocol stack for performing protocol processing on data to be exchanged via a network, offloading network processing of kernel level data of the rest of the subprocessors to the designated subprocessor when the rest of the subprocessors execute an application that uses the network; and the input/output interface transfers the individual headers and the aggregated header, either alone or in combination, to the local memory of the designated subprocessor, while transferring the concatenated payload to an area in main memory to be referred to by the main processor and the rest of the subprocessors.

2. A network processing apparatus as recited in claim 1, wherein the input/output interface transfers the individual headers or the aggregated header, either alone or in combination, to a protocol stack, while transferring the concatenated payload to the application layer directly.

3. A multiprocessor system comprising:

a main processor;

a plurality of subprocessors controlled by the main processor and each including a local memory, a designated subprocessor among the plurality of subprocessors designated by the main processor as a dedicated subprocessor to implement a protocol stack for performing protocol processing on data to be exchanged via a network, offloading network processing of kernel level data of the rest of the subprocessors to the designated subprocessor when the rest of the subprocessors execute an application that uses the network; and a main memory that is external to and shared by the main processor and the plurality of subprocessors, wherein:

when a plurality of packets with a data length equal to or less than a maximum transmission unit defined for the network are received from the network, data in which payloads of the plurality of packets are concatenated on a connection-by-connection basis is transferred to an area in the main memory to be referred to by the main processor and the rest of the subprocessors, while each individual header of the plurality of the packets concatenated on a connection-by-connection basis are transferred to the local memory of the designated subprocessor;

the designated subprocessor performs protocol processing on the plurality of the packets according to the individual headers transferred to the local memory thereof; and the rest of the subprocessors retrieve the concatenated data from the main memory in response to a result of the protocol processing by the designated subprocessor.

\* \* \* \* \*